United States Patent

[11] 3,580,140

| [72] | Inventor | William H. Walker<br>2210 104th S.E., Bellevue, Wash. 98004 |
|---|---|---|
| [21] | Appl. No. | 782,290 |
| [22] | Filed | Dec. 9, 1968 |
| [45] | Patented | May 25, 1971 |

[54] LOCKING MECHANISM FOR FLUID TYPE ACTUATORS
7 Claims, 5 Drawing Figs.

| [52] | U.S. Cl. | 92/25, 92/28 |
|---|---|---|
| [51] | Int. Cl. | F15b 15/26 |
| [50] | Field of Search | 92/24, 25, 26, 27, 28, 15, 23; 188/170 |

[56] References Cited
UNITED STATES PATENTS

| 2,632,425 | 3/1953 | Grover | 92/98 |
|---|---|---|---|
| 2,744,501 | 5/1956 | Chace et al. | 92/25 |
| 2,771,060 | 11/1956 | Allbright | 92/24 |
| 3,003,471 | 10/1961 | Bodem et al. | 92/24 |
| 3,177,780 | 4/1965 | Anderson et al. | 92/24 |
| 3,342,111 | 9/1967 | Royster | 92/24 |
| 3,350,987 | 11/1967 | Johnson | 92/24 |
| 3,444,783 | 5/1969 | Freed | 92/26X |
| 3,453,937 | 7/1969 | Haberman | 92/25X |

Primary Examiner—Martin P. Schwadron
Assistant Examiner—Leslie J. Payne
Attorneys—Glenn Orlob and Robert B. Hughes

ABSTRACT: A device mounted to the piston of a hydraulic actuator to mechanically lock the piston in its retracted position. The piston carries several locking segments which, with the piston retracted, reach inwardly to engage the head of a locking stud that is fixed to the cylinder. When hydraulic fluid is fed into the cylinder so as to extend the actuator, the hydraulic pressure first pushes back a locking piston (located within the main piston) which positively moves the locking segments out of engagement with the locking stud, and then the main piston moves to its extended position. With no hydraulic pressure acting to extend the main piston, the segments lock the piston in its retracted position.

PATENTED MAY 25 1971

INVENTOR:
WILLIAM H. WALKER
BY Robert B Hughes
ATTORNEY

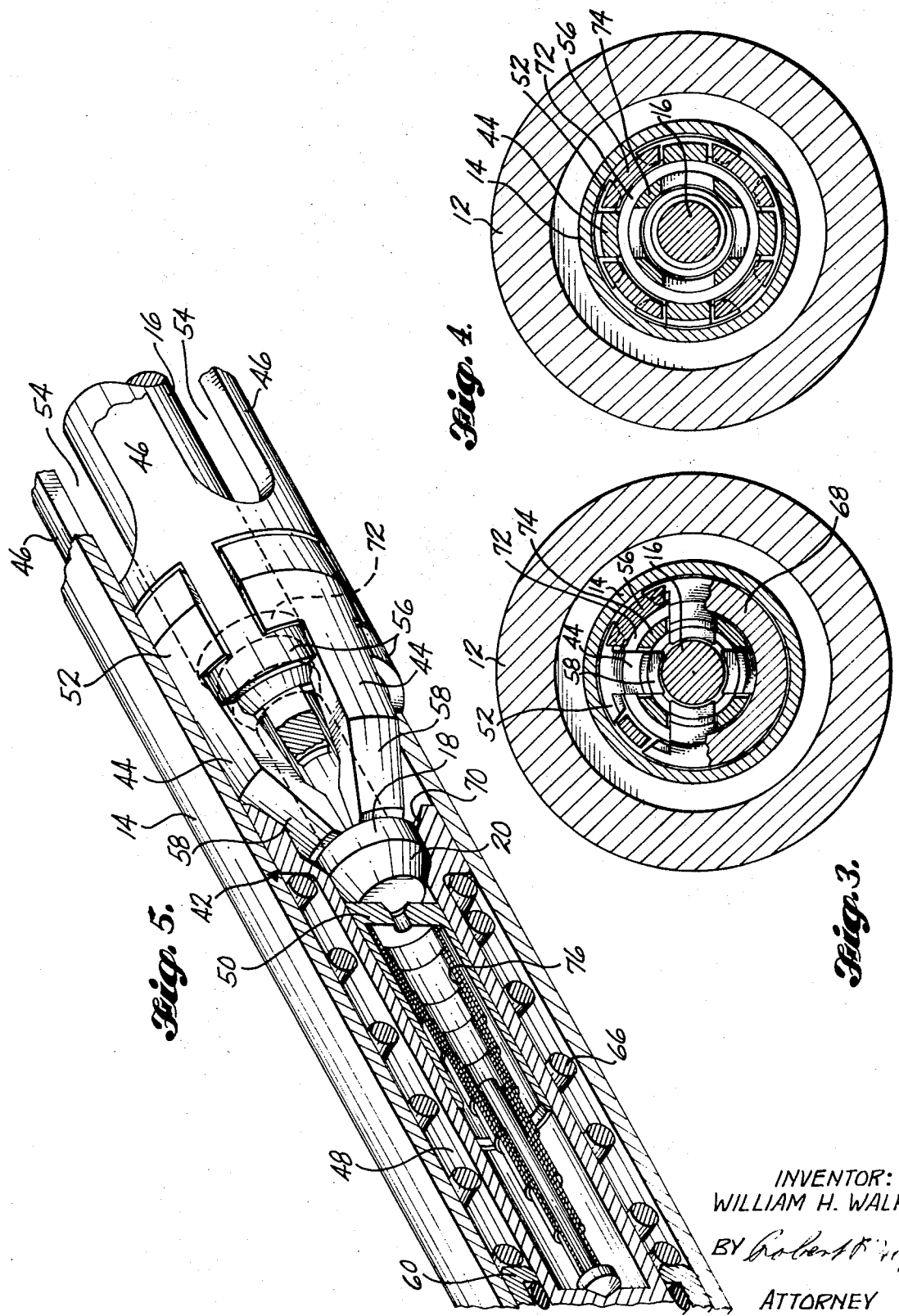

LOCKING MECHANISM FOR FLUID TYPE ACTUATORS

BACKGROUND OF THE INVENTION

1. Field of the Invention

This relates to a piston and cylinder type fluid actuator having a device which locks the actuator in either its extended or retracted position when there is no fluid pressure in the cylinder. However, when fluid pressure is introduced into the cylinder, the device is caused to unlock and thus permit the actuator to either extend or retract.

2. Description of the Prior Art

The prior art discloses several approaches. One is to utilize several balls which drop into detents when the piston has reached a predetermined position in the cylinder and thus lock the actuator, (e.g., as in U.S. Pat. No. 2,360,535, issued to ASHTON). Another approach is to utilize resilient fingers which spring into engagement with a locking element, with a second locking device holding the fingers in locking engagement (e.g., as in U.S. Pat. No. 2,808,810 to LINDLEY and U.S. Pat. No. 3,003,473 to OTTOSON).

SUMMARY OF THE INVENTION

The present invention was designed specifically for aircraft use; hence the emphasis must be on making a device which is compact, lightweight and highly reliable.

In the preferred embodiment of the present invention, a plurality of locking segments are mounted to the main actuator piston of the fluid actuator. There is a spring loaded locking piston which in its locked position positively holds the lock segments in engagement with a lock stud that is fixedly mounted to the cylinder. When fluid pressure is introduced into the cylinder to extend the actuator, the lock piston is pushed out of the locking engagement with the lock segments, and a second portion of the lock piston positively engages the segments to move them out of locking engagement with respect to the lock stud. Further, there is a segment stop which holds the lock segments in their unlocked position so as to prevent the lock piston from moving the segments into their lock position. When the actuator is retracted, the lock piston acts to move the lock segments into mechanical locking engagement with the locking stud.

A general object of the present invention is to provide a locking mechanism for a fluid actuator, which mechanism satisfies the requirements of being compact, lightweight and reliable.

A more specific object is to provide such a locking mechanism which, while satisfying the above stated requirements, has positive engagement with its locking elements to assure that both the locking and unlocking are accomplished with high reliability.

BRIEF DESCRIPTION OF THE DRAWINGS

FIG. 3 is a transverse view taken generally along line 3-3 of FIG. 1;

FIG. 4 is a transverse sectional view taken generally along line 4-4 of FIG. 2, and FIG. 5 is an isometric view showing mainly the locking mechanism and only a portion of the piston rod with this mechanism being in its locked position.

DESCRIPTION OF THE PREFERRED EMBODIMENT

Figure 1:
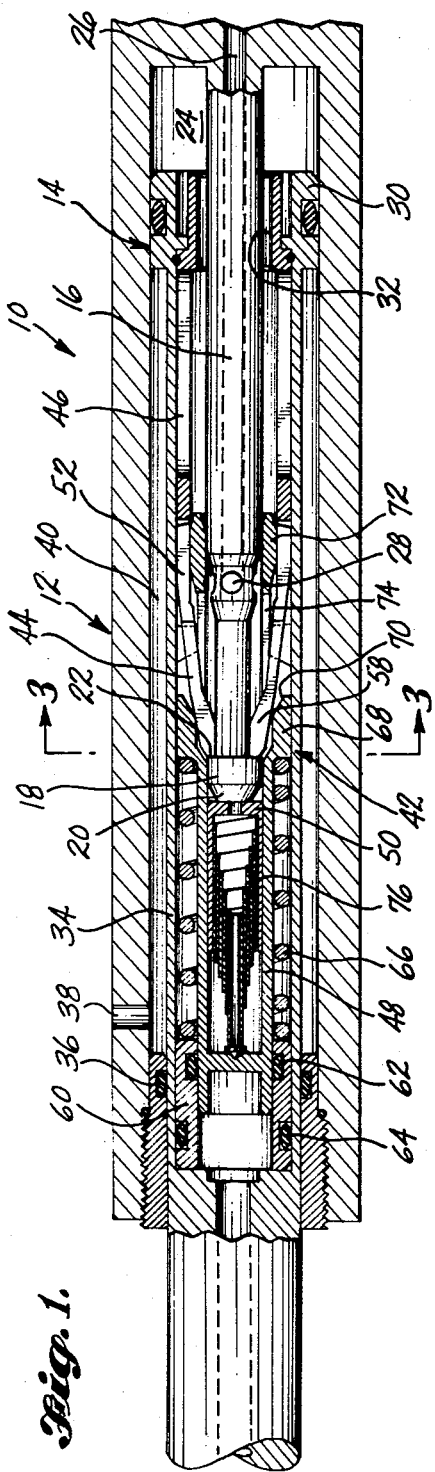
FIG. 1 is a longitudinal sectional view of the apparatus of the present invention, with the actuator in its locked position.

They hydraulic actuator 10 comprises a cylinder 12 and a piston 14 mounted for axial reciprocating motion therein. Fixedly mounted to the head or forward end of the cylinder 12 is a lock stud 16 which extends rearwardly along the center axis of the cylinder 12 and terminates in a lock head 18 having a beveled nose 20 and a forward facing annular shoulder 22. To feed hydraulic fluid under pressure into the extension chamber 24 of the cylinder 12, the lock stud is provided with a fluid passage 26 and fluid openings 28 communicating therewith.

The piston 14 has a head 30 having a through opening 32 to accommodate the lock stud 16. The piston rod 34 is in the form of a cylindrical sleeve which forms a seal at 36 with the tail or rear end of the cylinder 12. The cylinder 12 is provided with an opening (as at 38) to introduce pressurized fluid into the retracting chamber 40 of the cylinder 12.

Located within the piston rod or sleeve 34 is a lock mechanism 42. This lock mechanism comprises a plurality of locking segments 44, a segment retainer 46, a lock and unlock piston 48 and a segment stop 50.

In the present embodiment, there are four locking segments 44, each of which has a T tail 52 by which the individual segments 44 are held in the segment retainer 46. The retainer 46 is mounted within the piston rod 34 and abuts the piston head 30. (The segment retainer 46 is provided with cutouts 54 for weight saving.) The segment retainer 46 is provided with four T shaped arms 56 which interlock with the tail portions 52 of the segments 44 so as to retain the segments 44 in their proper locations in the lock mechanism 42.

The nose end 58 of each segment 44 is slanted to a moderate degree inwardly so that it can be properly engaged by the lock and unlock piston 48 to be brought into locking engagement with the annular shoulder 22 of the stud locking head 18. These segments 44 are brought both into and out of locking engagement with the stud 18 by means of the aforementioned lock and unlock piston 48.

This piston 48 is slide mounted in an annular insert 60 mounted in the piston rod 34 at about the midlength thereof. The insert is provided with seals at 62 and 64. Circumjacent to the piston 48 is a compression spring 66 which urges the piston 48 into its locking position.

So that the piston 48 can perform its locking function (by forcing the segments 44 into locking engagement with the stud head 18), the piston 48 is provided with a locking ring 68 whose forward end has an inwardly and rearwardly directed beveled annular face 70 adapted to engage the nose ends 58 of the segments 44 and push them inwardly. To enable the piston 48 to perform its unlocking function, the piston 48 has an unlocking ring 72 which is located forward of the ring 68 and is positioned (when the actuator 10 is retracted) circumjacent the lock stud 16. This ring 72 is fixedly secured to the piston 48 by means of four arms 74. When (as will be described hereinafter) the piston 48 is moved rearwardly against the urging of the spring 56, this unlocking ring 72 engages the inside surface of the segments 44 and moves them outwardly to the position shown in FIG. 2.

The aforementioned segment stop 50 is slide mounted within the main body of the lock and unlock piston 48. A compression spring 76 urges the stop member 50 forwardly to the position shown in FIG. 2, where the stop 50 is positioned inside the nose portions 58 of the segments 44 so as to keep the segments 44 in their unlocked position. The stop 50 is provided with a keeper (not shown) which rides in a slot (not shown) in the piston 48 to prevent the stop 50 from extending beyond the position shown in FIG. 2.

To describe the operation of the present invention, let it be assumed that the actuator 10 is in the retracted position shown in FIG. 1. In this position, the locking segments 44 engage the annular shoulder 22 of the stud head 18. Since the segments 44 are held in the retainer 46 which butts against the piston head 30, the piston 14 is prevented from extending. The lock and unlock piston 48 is in its locked position (as seen in FIG. 1), with the lock ring 68 engaging the segments 44 so as to hold them in their locked position.

When hydraulic fluid is forced under pressure through the passageway 26 and out the openings 28, the immediate effect of this hydraulic pressure is to move the lock and unlock piston 48 to the left. This causes: first, the lock ring 68 to release the segments 44, and second, the unlocking ring 72 to move rearwardly to lift the segments 44 out of engagement with the stud head 18. When the segments 44 have cleared the shoulder 22 of the stud head 18, the hydraulic pressure in the extension chamber 24 then causes the main piston 14 to move to the left.

Figure 2:
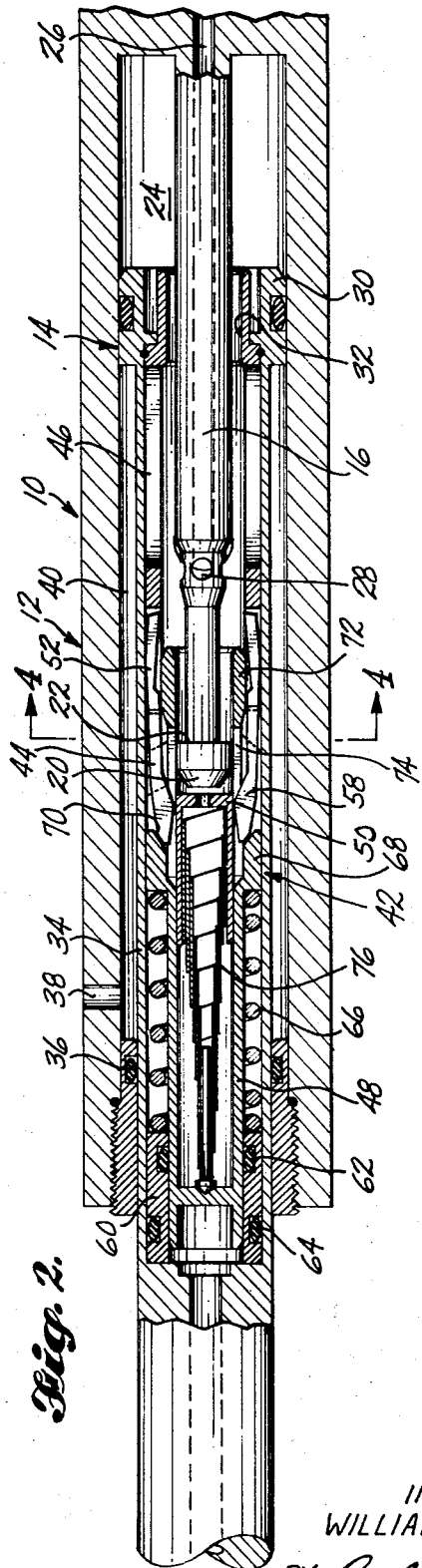
FIG. 2 is a view similar to FIG. 1, but with the actuator in its unlocked position.

As the piston 14 continues to extend, the segments 44 pass over the stud head 18 and come into engagement with the segment stop 50 which holds the segments 44 in their unlocked position (as seen in FIG. 2). Thus, the segment stop 50 prevents the piston 48 from pushing the segments inwardly.

When hydraulic fluid is fed through the opening 38 into the retraction chamber 40, the piston 14 moves to the right. When the segment stop 50 comes into engagement with the stud head 18, the stop 50 is pushed into the piston 48 so as to be out of engagement with the segments 44. As the main actuator piston 14 continues to retract, the segments 44 pass over the stud head 18, and then are forced into locking engagement with the stud head 18 by the piston 48 (as seen in FIG. 1).

We claim:
1. An actuator comprising:
   a. two actuator components, namely;
      1. a cylinder, and
      2. a piston mounted for reciprocating motion in said cylinder,
   b. means for admitting fluid pressure to the cylinder to cause said reciprocating motion;
   c. first lock means mounted to one of said actuator components, said lock means comprising:
      1. lock segment means comprising at least one lock segment having a nose end and a tail end, the nose end of said segment being mounted to said one component in a manner to be movable between a lock position and an unlock position,
      2. a lock segment engaging means mounted in said one actuator component to be movable between a locking position and an unlocking position and having a locking portion and an unlocking portion, said engaging means in traveling to its locking position having its locking portion acting to so operatively engage said lock segment means as to force its nose end into its lock position, and in traveling back to its unlocking position having its unlocking portion action to so operatively engage said lock segment means as to force its nose end out of its lock position into its unlock position,
      3. said lock segment moving means being so disposed as to be responsive to fluid pressure in said cylinder to be moved by said pressure from its locking to its unlocking position,
   d. second lock means mounted to the other of said actuator components and disposed to be positively engaged by the nose end of said lock segment means in its lock position, and
   e. a segment stop disposed to operatively engage the nose end of said lock segment means to hold said segment means in its unlocked position, said segment stop being disposed to be engaged by said second lock means in a manner that the segment stop is moved out of engagement with the nose end of said segment means when said segment means is moving toward its lock position, said second lock means comprising a stud mounted to said cylinder along the axial center line thereof, and having a lock head disposed to engage the nose end of said lock segment means in locking engagement.

2. An actuator comprising:
   a. two actuator components, namely;
      1. a cylinder, and
      2. a piston mounted for reciprocating motion in said cylinder,
   b. means for admitting fluid pressure to the cylinder to cause said reciprocating motion;
   c. first lock means mounted to one of said actuator components, said lock means comprising:
      1. lock segment means comprising at least one lock segment having a nose end and a tail end, the nose end of said segment being mounted to said one component in a manner to be movable between a lock position and an unlock position,
      2. a lock segment engaging means mounted in said one actuator component to be movable between a locking position and an unlocking position and having a locking portion and an unlocking portion, said engaging means in traveling to its locking position having its locking portion acting to so operatively engage said lock segment means as to force its nose end into its lock position, and in traveling back to its unlocking position having its unlocking portion acting to so operatively engage said lock segment means as to force its nose end out of its lock position into its unlock position,
      3. said lock segment moving means being so disposed as to be responsive to fluid pressure in said cylinder to be moved by said pressure from its locking to its unlocking position,
   d. second lock means mounted to the other of said actuator components and disposed to be positively engaged by the nose end of said lock segment means in its lock position; and
   e. the locking portion of said segment engaging means being a generally annular outer member which engages the outside of said segment means and moves the nose end of said segment means radially inwardly to the lock position, and the unlocking portion comprising a generally annular inner member which engages the inside of said segment means to move the nose end of the segment means radially outwardly to the unlock position.

3. The apparatus as recited in claim 2, wherein said segment engaging means is mounted for slide motion in said piston and has an associated spring which urges said segment engaging means toward its lock position.

4. The apparatus as recited in claim 3, wherein there is a segment stop which is slide mounted in said segment engaging means and has an associated spring which urges the segment stop toward a position where it engages said segment means to hold said segment means in its unlock position.

5. An actuator comprising:
   a. two actuator components, namely;
      1. a cylinder, and
      2. a piston mounted for reciprocating motion in said cylinder,
   b. means for admitting fluid pressure to the cylinder to cause said reciprocating motion;
   c. first lock means mounted to one of said actuator components, said lock means comprising:
      1. lock segment means comprising at least one lock segment having a nose end and a tail end, the nose end of said segment being mounted to said one component in a manner to be movable between a lock position and an unlock position,
      2. a lock segment engaging means mounted in said one actuator component to be movable between a locking position and an unlocking position and having a locking portion and an unlocking portion, said engaging means in traveling to its locking position having its locking portion acting to so operatively engage said lock segment means as to force its nose end into its lock position, and in traveling back to its unlocking position having its unlocking portion acting to so operatively engage said lock segment means as to force its nose end out of its lock position into its unlock position,
      3. said lock segment moving means being so disposed as to be responsive to fluid pressure in said cylinder to be moved by said pressure from its locking to its unlocking position,
   d. second lock means mounted to the other of said actuator components and disposed to be positively engaged by the nose end of said lock segment means in its lock position; and e. said lock segment means comprising a plurality of elongated segments, each segment having a tail end by which it is mounted in said piston and a nose end disposed to swing inwardly to engage the second lock means.

6. The apparatus as recited in claim 5, wherein said lock segment engaging means is mounted for slide motion in said piston and has an associated spring which urges the lock segment engaging means toward its lock position, the locking portion of said lock segment engaging means being disposed to engage the nose ends of said segments to move the segments to their lock position, and the unlocking portion of said segment locking means being disposed to engage the inner surface of the segments to lift them out of locking engagement with the second lock means.

7. An actuator comprising:
   a. two actuator components, namely;
      1. a cylinder, and
      2. a piston mounted for reciprocating motion in said cylinder,
   b. means for admitting fluid pressure to the cylinder to cause said reciprocating motion;
   c. first lock means mounted to one of said actuator components, said lock means comprising:
      1. lock segment means comprising at least one lock segment having a nose end and a tail end, the nose end of said segment being mounted to said one component in a manner to be movable between a lock position and an unlock position,
      2. a lock segment engaging means mounted in said one actuator component to be movable between a locking position and an unlocking position and having a locking portion and an unlocking portion, said engaging means in traveling to its locking position having its locking portion acting to so operatively engage said lock segment means as to force its nose end into its lock position, and in traveling back to its unlocking position having its unlocking portion acting to so operatively engage said lock segment means as to force its nose end out of its lock position into its unlock position,
      3. said lock segment moving means being so disposed as to be responsive to fluid pressure in said cylinder to be moved by said pressure from its locking to its unlocking position,
   d. second lock means mounted to the other of said actuator components and disposed to be positively engaged by the nose end of said lock segment means in its lock position;
   e. said lock segment means comprising a plurality of elongated segments, each segment having a tail end by which it is mounted to said piston and a nose end disposed to move inwardly to engage the second lock means;
   f. said lock segment engaging means being slide mounted in said piston and having a first generally annular member disposed to engage the nose ends of said segments to move said nose ends inwardly into locking engagement with said second lock means, and a second generally annular member located generally inside said segments and disposed to engage the inside of said segments to move the segments out of engagement with said second lock means;
   g. said lock segment engaging means having an associated spring by which it is urged to its locking position, and said lock segment engaging means so disposed in said piston that fluid pressure in said cylinder acting to extend said actuator pushes against the action of said spring to move said lock segment engaging means to its unlocking position;
   h. a segment stop slide mounted in said lock segment engaging means, said segment stop having an associated spring which urges the segment stop to a position where it holds the segments in their unlock position; and
   i. said second lock means comprising a lock stud mounted to said cylinder along the axial center line thereof, said lock stud having a lock head disposed to engage said segments in locking engagement, said lock head further disposed to engage said segment stop to move the segment stop against the action of its spring to disengage the segment stop from the segments.